(12) United States Patent
Greenlee et al.

(10) Patent No.: US 8,421,601 B2
(45) Date of Patent: Apr. 16, 2013

(54) ACTIVE/PASSIVE RFID TRANSPONDER CONTROL FUNCTION

(75) Inventors: Kenneth L. Greenlee, Raleigh, NC (US); Christian Lee Hunt, Cary, NC (US); Steven Michael Miller, Cary, NC (US); Anne Irene Ryan, Palo Alto, CA (US)

(73) Assignee: International Business Machines Corporation, Armonk, NY (US)

( * ) Notice: Subject to any disclaimer, the term of this patent is extended or adjusted under 35 U.S.C. 154(b) by 758 days.

(21) Appl. No.: 12/408,711

(22) Filed: Mar. 22, 2009

(65) Prior Publication Data

US 2010/0238002 A1 Sep. 23, 2010

(51) Int. Cl.
*H04Q 5/22* (2006.01)
(52) U.S. Cl.
USPC ........................................ 340/10.51; 340/10.3
(58) Field of Classification Search ............... 340/10.52, 340/10.51, 1.1, 10.1
See application file for complete search history.

(56) References Cited

U.S. PATENT DOCUMENTS

| | | | |
|---|---|---|---|
| 7,002,474 B2 | 2/2006 | De Souza et al. | |
| 7,083,085 B1 | 8/2006 | Daniels et al. | |
| 7,271,727 B2 | 9/2007 | Steeves | |
| 7,295,108 B2 | 11/2007 | Corrado et al. | |
| 7,316,352 B1* | 1/2008 | Dodt et al. | 235/451 |
| 7,429,913 B2 | 9/2008 | Kim et al. | |
| 7,446,657 B2 | 11/2008 | Shaffer et al. | |
| 7,463,156 B2 | 12/2008 | Baba et al. | |
| 7,486,192 B2 | 2/2009 | Yamagajo et al. | |
| 7,492,812 B2 | 2/2009 | Ninomiya et al. | |
| 2005/0248438 A1* | 11/2005 | Hughes et al. | 340/10.4 |
| 2007/0159338 A1 | 7/2007 | Beber | |
| 2007/0262849 A1 | 11/2007 | Ismail | |
| 2008/0150698 A1* | 6/2008 | Smith et al. | 340/10.4 |
| 2009/0021353 A1 | 1/2009 | Nonaka | |
| 2009/0303049 A1* | 12/2009 | Greenlee et al. | 340/572.3 |

OTHER PUBLICATIONS

Claire Swedburg, New Axcess Chip Can Be Active or Operate as Passive Gen 2, RFID Journal, Inc., 2005.
Christoph Jechlitschek, A Survey Paper on Radio Frequency IDentification (RFID) Trends, file://X:\www-docs\cse574-06\ftp\rfid\index.html, May 2006.
Passive RFID Tags vs. Active RFID Tags, abrfid.com/.../passive-active-tags.aspx.
Web posting: web.archive.org/.../howitworks.php.
Dual-Mode RFID Active/Passive HF RFID, For Extended Range and Higher Comfort, Advanced Product Information; Dual-Mode RFID_PB03.doc—Feb. 2008 (c) IDS Microchip AG.
Gaetano Marrocco, The Art of UHF RFID Antenna Design: Impedance-Matching and Size-Reduction Techniques; IEEE Antennas and Propagation Magazine, vol. 50, No. 1, Feb. 2008, pp. 66-79.

* cited by examiner

*Primary Examiner* — Brian Zimmerman
*Assistant Examiner* — Sara Samson
(74) *Attorney, Agent, or Firm* — Grasso PLLC; Fred Grasso

(57) ABSTRACT

Devices, systems, processes, and articles of manufacture are provided herein. These may include an RFID transponder having a microprocessor, nonvolatile memory, a battery, and an antenna, wherein the microprocessor is configured to operate in a passive mode and a battery operated mode, and wherein, when in the passive mode only a portion of the microprocessor may be powered by energy received from an RFID reader interrogating the RFID transponder. The RFID transponder may further include MEMS sensors coupled to the microprocessor and the microprocessor may be further configured to add physical data, instructions, or a unique identifier of the RFID transponder to the nonvolatile memory.

24 Claims, 3 Drawing Sheets

ACTIVE/PASSIVE RFID TRANSPONDER CONTROL FUNCTION

BACKGROUND

The field of the invention regards Radio Frequency IDentification (RFID) transponders. More specifically, the field includes "hybrid" RFID transponders with active and passive functionality and the control of the active and passive functionality of these hybrid RFID transponders.

Radio Frequency IDentification (RFID) is used in various applications in today's commerce. RFID technology involves the use of: (a) relatively small portable RFID transponders or "tags"; (b) RFID readers that detect the presence of these tags when the tags pass into an interrogation zone of the RFID readers; and (c) a network that is accessible to manage and store the detection of the tags passing through the interrogation zones of the readers.

RFID tags comprise an antenna and control logic, and in some instances an internal power source as well. When a tag contains a power source, the tag may be referred to as an active tag. Active tags can announce their presence whether or not they are receiving power within an interrogation zone of an RFID reader. Tags without an internal power source are referred to as passive tags. Passive tags announce their presence when they are in the interrogation zone of an RFID reader because passive tags are powered by the fluctuating electromagnetic field of the RFID reader.

Both passive and active tags acknowledge their presence and provide their unique identity by modulating electromagnetic waves, in various radio frequency bands, back to the RFID reader. These frequency bands can include low frequencies (e.g., 125-134 kHz), high frequencies (e.g., 13.56 MHz) bands, and ultrahigh frequencies (e.g., 915 MHz). The modulated signals broadcast from the tag's antenna acknowledge the tag's presence to any RFID reader within range of receiving the tag's modulated signal.

Active RFID tags may be detected at one-hundred feet or more and may be broadcasting signals that provide information regarding the location of the active RFID tag, contents of the container to which the tag is affixed, and the unique identifier for the tag itself. Modulated signals from passive tags have a much smaller range and can contain much less data. These signals may be detected in an area of three to ten feet from the tag and may provide little if any information to the reader receiving the signal beyond a unique identification of the tag itself.

The RFID reader may be networked with other system components or databases that can be used to record the presence of a tag at a particular place and time. This presence may be used for tracking shipments, confirming receipt, and for reconciling accounts associated with the RFID tag and the particular object to which the tag is affixed.

The readers and tags communicate "over the air" using various standard communication protocols. These communication protocols enable tags to be read by various RFID readers along a supply chain or other product movement chain of handlers.

BRIEF SUMMARY

Devices, systems, processes, and articles of manufacture are provided herein. These may include an RFID transponder having a microprocessor, nonvolatile memory, a battery, and an antenna. The microprocessor of this transponder may be configured to operate in a passive mode and a battery operated mode. In the passive mode only a portion of the microprocessor may be powered by energy received from an RFID reader interrogating the RFID transponder. The RFID transponder may further include MEMS sensors coupled to the microprocessor and the microprocessor may be further configured to add physical data, instructions, or a unique identifier of the RFID transponder to the nonvolatile memory.

The processes may include actions for controlling an RFID transponder, the actions possibly including receiving an interrogation radio frequency signal at an antenna of an RFID transponder, activating a portion of a microprocessor of the RFID transponder using power from the radio frequency signal, receiving information to be written to a nonvolatile memory of the RFID transponder, and writing the information to the nonvolatile memory of the RFID transponder. The information, which when read, may include instructions for operating the RFID transponder in a battery powered mode.

The article of manufacture may include a non-volatile computer readable storage medium, the storage medium containing instructions, which when executed, cause a microprocessor of an RFID transponder, when receiving data from an RFID reader/writer, to operate in a passive mode and also in a battery powered mode, the passive mode being used to write instructions in nonvolatile memory of the RFID transponder that control functions of the RFID transponder when the RFID transponder is operating in battery powered mode.

DETAILED DESCRIPTION

Embodiments are directed to an RFID transponder having passive and active components or features. In certain embodiments, an inventive transponder may be configured with shared components that may be used when the transponder is functioning in an active mode or in a passive mode. These shared components may include the microprocessor, one or more antenna, one or more MEMS sensors, and nonvolatile memory.

In embodiments, the logic of the microprocessor may be configured such that when the transponder is functioning in a passive mode, the instructions that may be carried out in the active or passive mode of the transponder may be programmed or reprogrammed. The active controls that may be programmed or reprogrammed may include the on/off timing of the active functions of the RFID transponder, the beaconing functionality of the active mode of the RIF transponder, the power of transmission in the active mode of the RFID transponder, the affect temperature or another sensed parameter may have on performance of the RFID transponder, the identity of any materials stored in transponder memory, attributes of a quiescent mode of the transponder, attributes of self-expiration of the transponder, the frequencies in which the transponder may communicate, a change in the identification of the transponder identity, and various other attributes of the transponder when the transponder is in an active mode or a passive mode.

The active attributes or functions may be modified or programmed by changing logic positions in nonvolatile memory of the transponder as well as by triggering the activation of the transponder, which may then carryout the changes in the applicable memory positions. In embodiments, logic in the nonvolatile memory may be modified based on instructions sent to the transponder from an RFID reader/writer. These programmed instructions may then be read by the microprocessor of the transponder when the transponder is in an active or battery powered mode. These instructions may be stored in nonvolatile memory in a modified EPC syntax as well as in various other memory location methodologies. In embodiments, the instructions received from an RFID reader/writer may be sent to the microprocessor of the transponder and may signal the contemporaneous awakening of the microprocessor. Other features of the RFID transponder may be controlled or programmed. Likewise, other methods for programming the transponder memory may be used as well.

Figure 1:
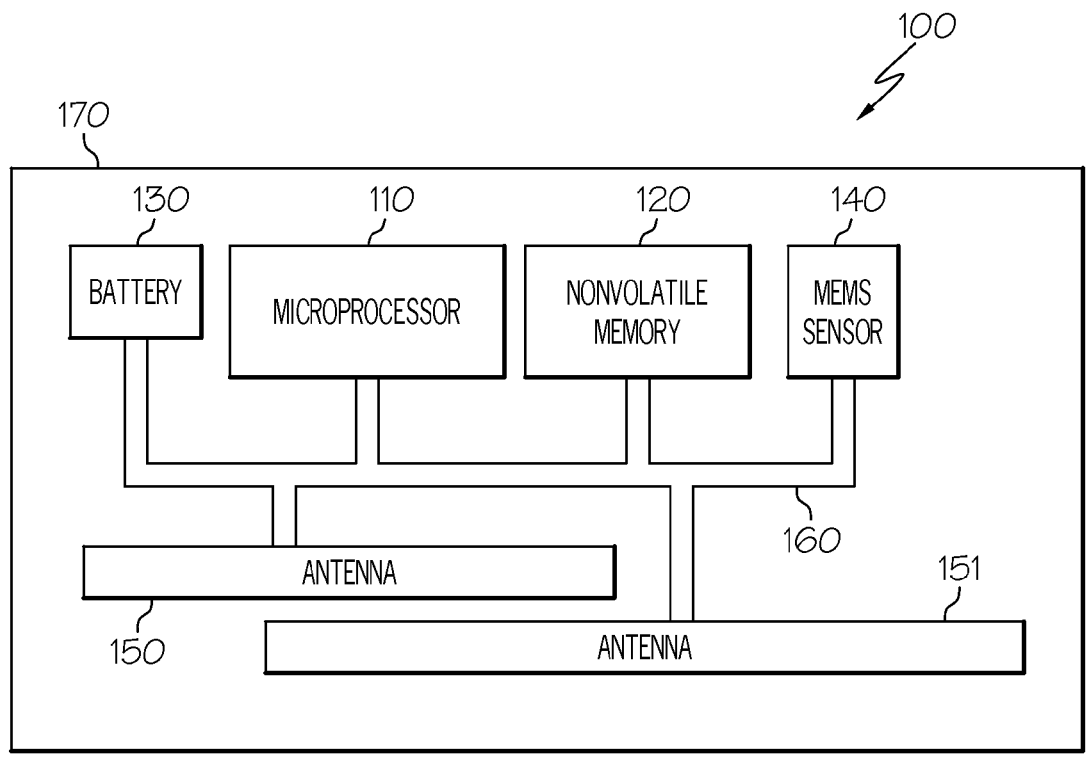
FIG. 1 shows a block diagram of an RFID transponder with exemplary features.

FIG. 1 shows a block diagram of an exemplary RFID transponder 100. This transponder 100 is shown with a battery 130, a microprocessor 110, nonvolatile memory 120, a MEMS sensor 140, antennas 150 and 151, and a bus 160 connecting each of these components, with all the components on a substrate 170. Other examples of an inventive transponder may include more or fewer components.

The microprocessor 110 of the transponder 100 may be configured such that it may be powered by the battery 130 as well as by power received through one or both antennas. When being powered by the antennas, the microprocessor 110 may be thought of as being in passive mode. When functioning in passive mode, portions of the microprocessor may remain idle or in a quiescent state to reduce the amount of energy needed to power the microprocessor.

In the passive mode the microprocessor 110 may be configured to read from and write to the nonvolatile memory 120. The write functions may be used to write to control logic of the microprocessor 120 used during active mode, while the read functions may be used to provide the necessary backscattering signals when the transponder is within an interrogation zone of an RFID reader. Other functionality of the transponder may be controlled as well. This functionality may include adjusting features associated with the MEMS sensor, such as temperature variant features, or stress and strain features of the transponder. Features associated with the active mode of the transponder may also be controlled. The active controls that may be programmed or reprogrammed may include, the on/off timing of the active functions, the beaconing functionality of the active mode, the power of transmission in the active mode, the affect temperature or another sensed parameter may have on performance in the active mode, the identity of any materials stored in transponder memory, attributes of a quiescent mode of the transponder, attributes of self-expiration of the transponder, the frequencies in which the transponder will communicate, a change in the identification of the transponder identity, and various other attributes of the transponder when the transponder is in an active mode or a passive mode.

In both the active and passive mode, one or both of the antennas may be used to increase the likelihood that signals will be read properly by the transponder, and backscattered by the transponder for receipt by the RFID reader/writer.

Embodiments of the transponder may include passive tag circuitry consistent with magnetic induction (near field RFID) and electromagnetic (EM) wave capture (far field RFID). In the magnetic induction circuit a coil coupled to a capacitor may be used to accumulate a charge that may then be used to power the circuitry of the tag and to create a magnetic field that can be read by a nearby reader. In the electromagnetic wave capture circuit a dipole antenna may be used to receive energy as alternating potential from a reader in order to accumulate energy to power its applicable circuitry. The antenna of this EM passive circuitry may be tuned to a frequency that can absorb signals at that frequency and reflect signals when there is a mismatch. These reflected mismatched waves may then be read by an antenna of a reader. Information may be encoded on this mismatched signal through modifications in the impedance over time thereby reflecting back more or less of the signal to the reader.

Figure 2:
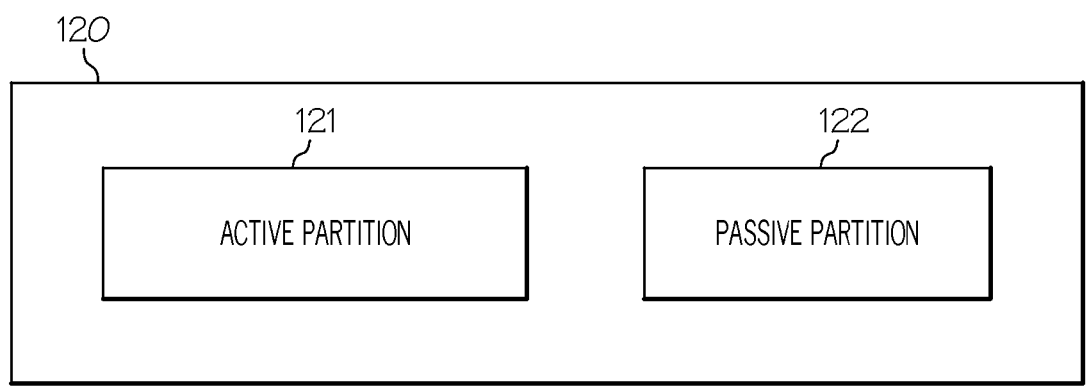
FIG. 2 shows a block diagram of the nonvolatile memory of the transponder of FIG. 1.

FIG. 2 shows an exemplary configuration of nonvolatile memory 120. This nonvolatile memory 120 may be EEPROM memory, flash memory and other types of nonvolatile memory. It is preferred that the memory 120 be able to change logical position with relatively small amounts of consumed power. In embodiments, the memory 120 may contain partitions wherein some are designated for active control and some are designated for passive control. The passive partition 122 may be read from and written to by the microprocessor 110 when the microprocessor 110 is receiving power from an RFID reader.

Memory positions in the passive partition 122 may be designated as indicia for controlling various functions of the transponder and also for adjusting portions of memory associated with the identity of the transponder. The functionality that may be adjusted or controlled may include the functions described herein as well as other functions not specifically mentioned herein. The memory being adjusted may be adjusted by being toggled between logical states. Moreover, more complex instructions may also be provided to the memory as well. These instructions may include modifying the EPC code of the transponder 100 as well as modifying data reflecting the contents of the container associated with the transponder 100 or the shipping history of the transponder 100.

Figure 3:
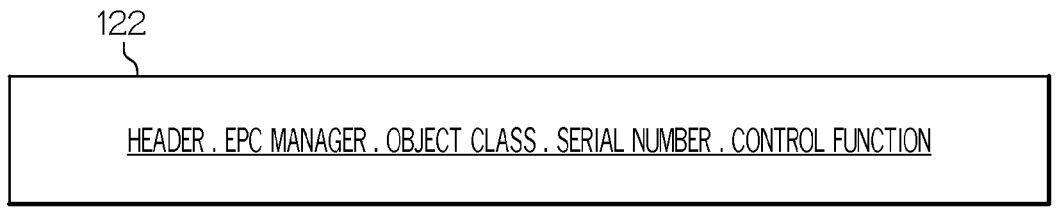
FIG. 3 shows a modified electronic product code syntax that may be stored in the passive partition of the nonvolatile memory of FIG. 1.

FIG. 3 shows an exemplary modified EPC code. As can be seen, a control function has been added to the end of this EPC code. This control function at the end of the EPC may be written to and read from when the transponder is functioning in a passive state or an active state. The control function may be a single byte of memory or several bytes. The control function may be used to control or adjust various features of the transponder when the transponder is in an active state or a passive state. For example, if a "zero" state is selected, the transponder may not acknowledge its presence when the transponder is in an interrogation zone of an RFID reader/writer.

Likewise, if a "double" state is designated, the transponder may identify itself twice to any RFID reader that interrogates the transponder.

Figure 4:
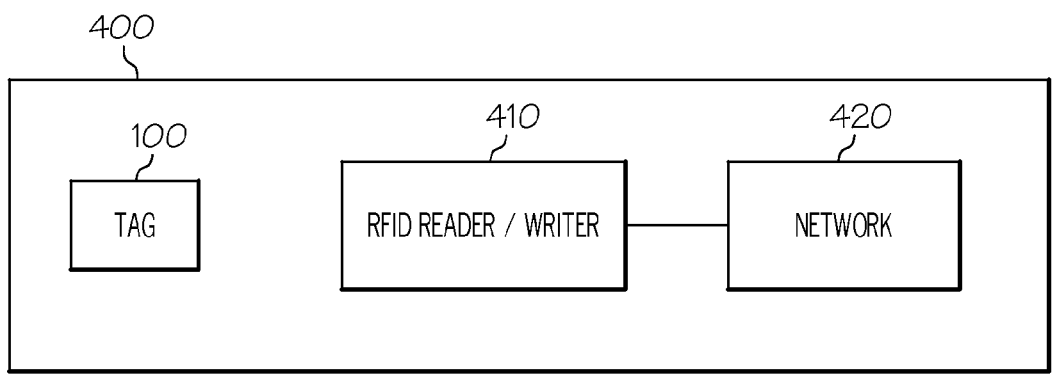
FIG. 4 shows a block diagram of an automatic identification system using the transponder of FIG. 1.

FIG. 4 shows a block diagram of a system 400 that may be employed in embodiments. This system 400 may include the transponder 100, an RFID reader/writer 410, and a support network 420. The support network 420 may be configured to provide the necessary control functions to the reader/writer 410 when the transponder 100 is being interrogated by the reader/writer 410. The network 400 may contain databases, which are not shown, that record the presence of the specific transponder 410 as well as servers, which are also not shown, that may provide instructions for programming transponders being interrogated.

In embodiments, the network 400 may be configured to program all transponders with a certain feature as well as only certain transponders with a certain feature. In one example, all transponders interrogated prior to midnight on a certain day may be configured to enter active mode in 180 days, while all transponders interrogated after midnight in that time frame may be configured to enter active mode in another time period, e.g., 270 days. In another example, specific instructions may be provided for all transponders affixed to packages weighing less than a certain weight. These transponders may go active immediately in order to hasten their shipping or some other desired action. Many other parameters and programming features may be carried out by the network 400 as well. In these embodiments, the passive read/write function may be used to modify attributes of the transponder. Once modified, the containers associated with the transponder may be handled in a different fashion.

Figure 5:
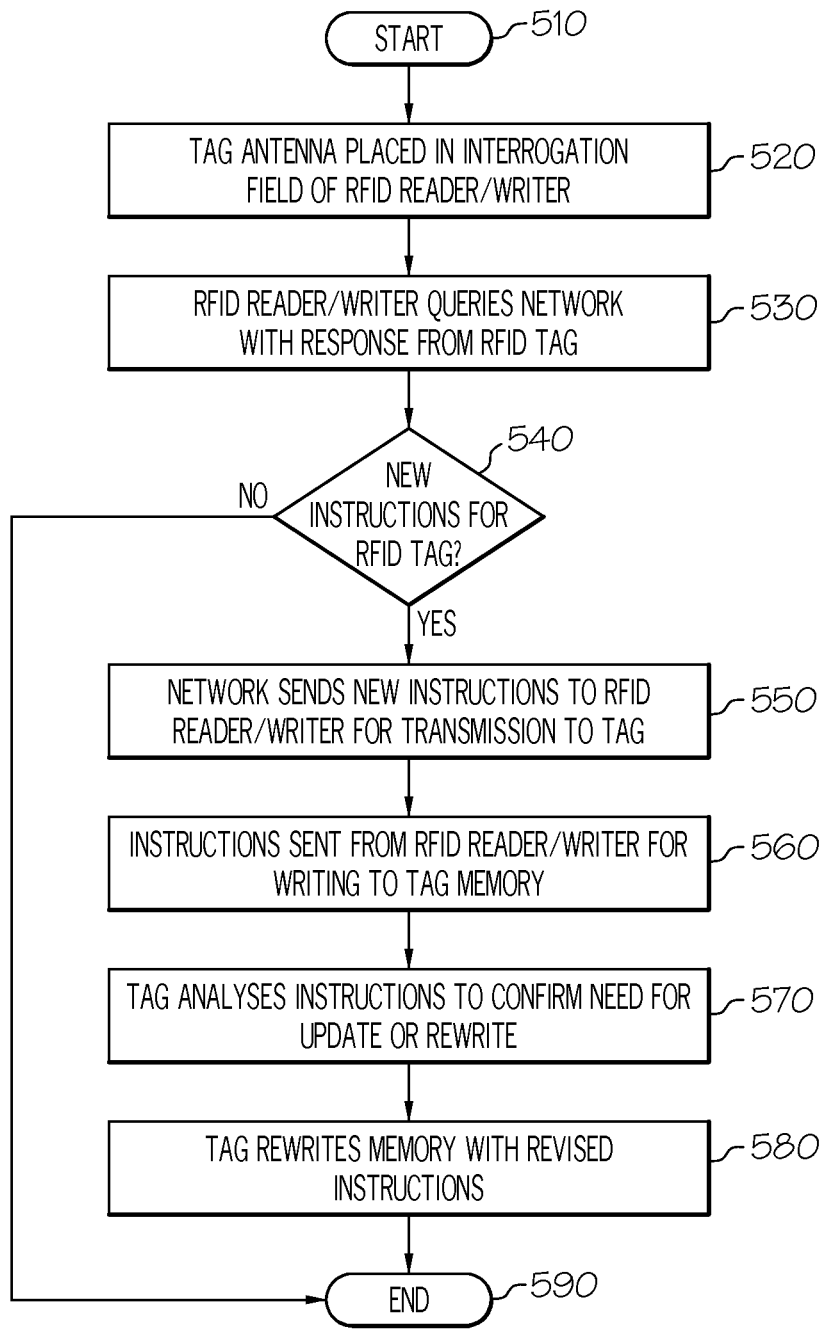
FIG. 5 shows a chart reflecting a process of an exemplary embodiment.

FIG. 5 is a flow chart of embodiments. The processes or steps identified therein may be carried out in the disclosed order or in other orders and with more or fewer steps, all while remaining within the scope of the disclosure and the accompanying invention. After starting at 510, an antenna of a tag may be placed in an interrogation zone of an RFID reader/writer (520). Once there, the RFID reader/writer may query a network with the response from the transponder (530). If new instructions are present in the network for the transponder, these instructions may be sent to the reader writer, as shown at 550. These new instructions may then be sent to the tag for writing to the tag's memory as reflected in 560. The tag may confirm that the instructions are new as shown at 570 and then write the instructions to memory as shown at 580. Once written to memory, the instructions may be used by the tag at subsequent times for controlling the operation or output of the tag. This operation can include adjusting the periodic RF transmit mode. In this mode, the tag can transmit the tag's ID value on a periodic basis. This functionality permits auto tracking of the tag.

Embodiments may also include a "handshake" acknowledgement step between a reader and a tag. This handshake may include the reader generating a continuous radio frequency sine wave and continually watching for modulation to occur. When modulation is detected this may indicate the presence of a tag. Once the tag has received sufficient energy to operate correctly, the tag may begin clocking its data to an output transistor, which may be connected across input coils for the tag. The output transistor may shunt the coil in a manner corresponding to the data which is being clocked out of a memory array of the tag. This clocking may cause a slight change in amplitude of the carrier wave that may be seen by one or more antennas of the reader. The shunting of the tag coil in this fashion may be considered to be backscatter modulation. This amplitude variance may be processed by the reader as a resulting bitstream and encoded according to existing protocols being used by the tag and the reader. The amplitude may be measured on one or more side channels of the reader. These side channels may be located directly above or below the frequency on which the reader is broadcasting. The data may be coded using various protocols including non-return to zero direct, differential biphase, and Manchester biphase. Each of these methods adjusts the signal to indicate digital data transmitted from the tag to the reader.

When collisions in tag data is received by a reader, various techniques may be used to address and resolve these collisions. These can include arbitration such that only one tag will transmit its data at a time.

The tags and readers may use various frequencies including low frequencies (30-500 kHz), high frequencies (10-15 Mhz) and ultra high frequencies (850-950 MHz, 2.4-2.5 GHz, AND 5.8 GHz) The frequency chosen for operation may depend on the intended us of the RFID system where high frequencies may be more useful for short read times while lower frequencies may be more useful in environments with high metals and fluid environments and when larger spiral inductors may be used in the tags.

Standards that may be employed, at least in part, include ISO11784-85, ISO 14223, ISO 10536, ISO 14443, ISO 15693, and ISO 1800.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

Embodiments may also be implemented as a computer process, a computing system or as an article of manufacture such as a computer program product of computer readable media. The computer program product may be a computer storage medium readable by a computer system and encoding a computer program instructions for executing a computer process.

The present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiments were chosen and described in order to best explain the principles of the invention and the practical application, and to enable others of ordinary skill in the art to understand the invention for embodiments with various modifications as are suited to the particular use contemplated.

What is claimed is:

1. An RFID transponder comprising:
a transponder substrate;
a microprocessor associated with the substrate;
an antenna associated with the substrate;
nonvolatile memory associated with the microprocessor,
    wherein the nonvolatile memory stores an identity of the RFID transponder; and
a battery associated with the substrate;
    wherein the microprocessor is configured to operate in a passive mode and in a battery powered mode, the passive mode involving microprocessor operations where portions of the microprocessor remain in a quiescent low power state to reduce the amount of energy needed to power the microprocessor,
    wherein, when in the passive mode, the microprocessor is configured to write instructions to nonvolatile memory for operating the RFID transponder in battery powered mode,
    wherein power for the microprocessor in the passive mode is received through the antenna and
    wherein power for the microprocessor in the battery powered mode is received from a battery.

2. The RFID transponder of claim 1 wherein the nonvolatile memory retains the identity of the transponder and the microprocessor uses the same identity when the microprocessor is functioning in the battery powered mode and in the passive mode.

3. The RFID transponder of claim 1 further comprising:
a micro-electro-mechanical system sensor coupled to the substrate.

4. The RFID transponder of claim 1 wherein the microprocessor is configured to write to nonvolatile memory when operating in the passive mode.

5. The RFID transponder of claim 4 wherein, when writing to nonvolatile memory, the microprocessor is configured to add physical data to the nonvolatile memory, the physical data provided by instructions received from an RFID reader, the physical data reflecting contents of a container to which the transponder is associated.

6. The RFID transponder of claim 4 wherein the microprocessor is configured to modify functionality of the transponder when the transponder is in the battery powered mode.

7. The RFID transponder of claim 6 wherein information written to nonvolatile memory includes information associated with the identity of the transponder.

8. The RFID transponder of claim 1 wherein the microprocessor is configured to access and modify an EPC code of the transponder, the EPC code used to identify the transponder when the transponder is in a battery powered mode or in a passive mode.

9. The RFID transponder of claim 6 wherein the functionality of the transponder includes one or more of: the beaconing cycle time of the transponder, the signal strength of the transponder, or the duration of a quiescent cycle of the transponder.

10. The RFID transponder of claim 1 wherein the nonvolatile memory further stores attributes of self-expiration of the transponder or instructions specific to a certain weight of a package to which the transponder is affixed.

11. The RFID transponder of claim 1 wherein the nonvolatile memory is partitioned with memory designated for active mode control and memory designated for passive mode control.

12. A method for controlling an RFID transponder, the method comprising:
receiving an interrogation radio frequency signal at an antenna of an RFID transponder;
activating a portion of a microprocessor using power from the interrogation radio frequency signal, with one or more other portions of the microprocessor remaining in a quiescent low power state to reduce the amount of energy needed to power the microprocessor;
receiving information to be written to a nonvolatile memory of the RFID transponder; and
writing the information to the nonvolatile memory of the RFID transponder,
wherein the information written includes data, which when read, provides instructions for operating the RFID transponder in a battery powered mode,
wherein power is received from a battery for one or more portions of the microprocessor remaining in a quiescent low power state.

13. The method of claim 12 wherein the information written also includes data identifying the contents of a container linked to the RFID transponder.

14. The method of claim 12 wherein the data also includes instructions for changing the frequency on which the RFID transponder will communicate when the RFID transponder is in a battery powered mode.

15. The method of claim 12 wherein the data also includes instructions for the amount of power of transmission of the RFID transponder when the RFID transponder is in a battery powered mode.

16. The method of claim 12 wherein the data also includes instructions for a start time to activate the RFID transponder in a battery powered mode.

17. The method of claim 12 wherein the data, which when read, provides instructions for operating the RFID transponder in a passive mode.

18. The method of claim 12 wherein the data also includes instructions for the self-expiration of the RFID transponder or instructions specific to a certain weight of a package to which the transponder is affixed.

19. An article of manufacture comprising:
a non-volatile computer readable storage medium,
the storage medium containing instructions, which when executed, cause a microprocessor of an RFID transponder, when receiving data from an RFID reader/writer, to operate in a passive mode or in a battery powered mode, the passive mode and the battery powered mode each providing that portions of the microprocessor remain in a quiescent low power state to reduce the amount of energy needed to power the microprocessor,
the passive mode being used to write instructions in nonvolatile memory of the RFID transponder that control functions of the RFID transponder when the RFID transponder is operating in battery powered mode,
wherein power for the microprocessor in the passive mode is received through an antenna, and
wherein power for the microprocessor in the battery powered mode is received from a battery.

20. The article of manufacture of claim 19 wherein the functions include the duration of a quiescent period of the RFID transponder.

21. The article of manufacture of claim 19 wherein the functions include a transmission power setting of the RFID transponder.

22. The article of manufacture of claim 19 wherein the instructions, which when executed further cause the microprocessor of the RFID transponder to receive data and write the data to nonvolatile memory of the RFID transponder.

23. The article of manufacture of claim 22 wherein the data is a unique identifier of the RFID transponder.

24. The method of claim 19 wherein the instructions, which when executed further cause the self-expiration of the RFID transponder or the activation of the transponder when the weight of a package to which the transponder is affixed is below a specified weight.

* * * * *